C. W. BILLING.
Seed-Planter.
No. 10,632. Patented Mar. 14, 1854.
Fig. 1.
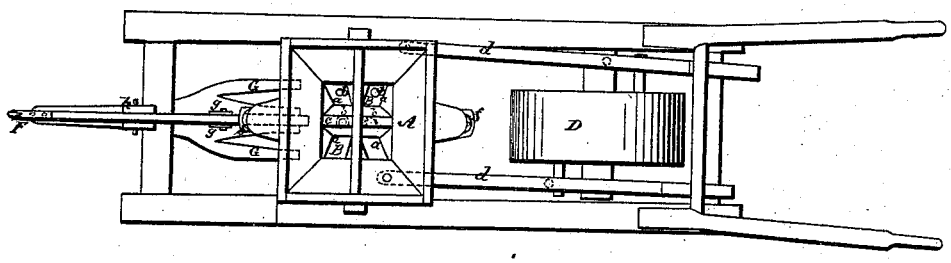
Fig. 2.
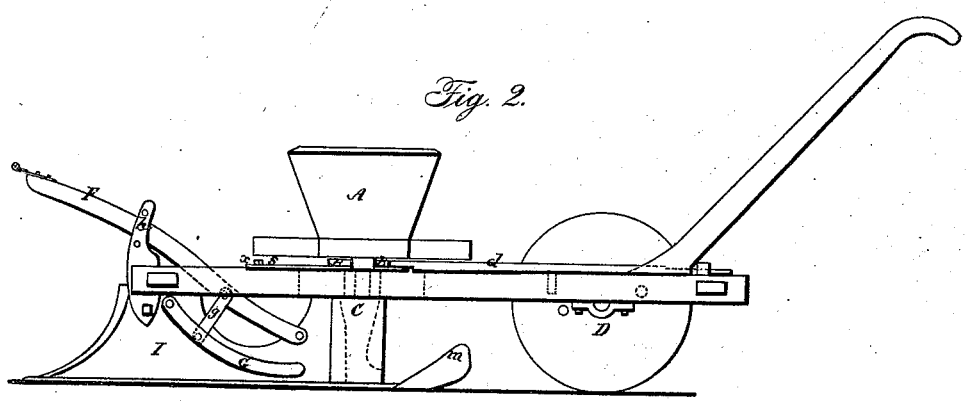
Fig. 4. Fig. 3. Fig. 5.
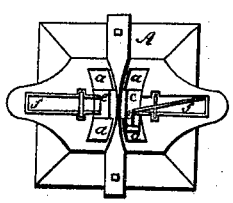 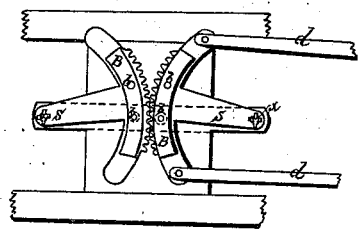 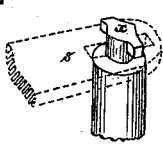

UNITED STATES PATENT OFFICE.

CHARLES W. BILLINGS, OF SOUTH DEERFIELD, MASSACHUSETTS.

IMPROVEMENT IN SEED-PLANTERS.

Specification forming part of Letters Patent No. 10,632, dated March 14, 1854.

*To all whom it may concern:*

Be it known that I, CHARLES W. BILLINGS, of South Deerfield, in the county of Franklin and State of Massachusetts, have invented certain new and useful Improvements in Corn or Seed Planters, of which the following is a full, clear, and exact description, reference being had to the accompanying drawings, which form part of this specification, and in which—

Figure 1 represents a plan of my improved planter; Fig. 2, a side elevation thereof; Fig. 3, a plan showing the arrangement of the vibrating geared segments for receiving and discharging the seed; Fig. 4, an inverted view of the hopper, showing the self-adjusting spring-slides, which operate in connection with the seed-segments; and Fig. 5, a view in perspective of the pivot-joint of the vibrating segments.

In the planter represented in the accompanying drawings the corn or seed, together with the fertilizing material, if any be used, is discharged from the hopper A through outlets *a* in the bottom of the hopper into holes or cavities *b* made in vibrating segment-slides B, which, as they vibrate, receive the seed from the hopper and discharge it into the distributing or depositing tube C, as follows: The outlets *a* in the bottom of the hopper are made in pairs—two on either side—forming a central partition or dividing-piece, *c*, between them. The receiving-holes *b* in the seed-segments are also made in pairs—that is, two in each—at the same distance apart, or thereabout, as the width of the partition or dividing-piece *c*, so that as the segments are caused to vibrate they will alternately take in seed from either side of the partition, and, as the seed-receptacles *b* in the segments arrive over the central distributing-tube, or over apertures communicating therewith, discharge the seed into the distributing-tube C. These seed segment-slides are pivoted at the extremities of central branches or arms, *s*, projecting from them to the frame of the machine, and are geared together by cogs or teeth on their peripheries, so that only the one segment is required to be operated to move them both, and this is done by reciprocating arms *d*, which are jointed to the ends of the back segment at their one end, and are hung loosely so as to slide freely in the hinder part of the frame at their other end, the back carrying and covering roller, D, of the planter serving to reciprocate the said rods or arms and give the requisite vibratory action to the seed-segments by wrist-pins, which project from the sides of the said roller and alternately strike pegs projecting from the under sides of the rods, so as to give a forward stroke to either rod alternately; or the one segment may be operated by any different arrangement of means, and the discharging-outlets in the hopper and seed-segments be otherwise proportioned and arranged to receive and discharge the seed; also, the hopper may be extended and a multiplicity of the vibrating geared seed segments be arranged side by side, according to the number of rows it is desired to plant at a time, but in this description it is deemed better, for the more simple illustration of the action of the machine, to refer to only one pair of geared segments, which, by taking in seed simultaneously from the hopper, diversify the points of discharge or divide the delivery of the seed from the hopper, and will therefore be less liable to fail in taking in the seed than were one slide taking in the seed from only one point in the hopper used, while by dividing the hopper between the segments the one seed slide or segment may be used for discharging one kind of seed, and the other segment for discharging another kind when it is desired to discharge different descriptions in equal or other given proportions simultaneously from the hopper. In planting corn in hills—say two kernels at a time—this arrangement of the seed-slides will insure great regularity, as each seed-hole in the segments may only be proportioned to hold one kernel, and of such size that it could not take in two, whereas were one slide only used with an aperture to contain two kernels the difference in the sizes of the kernels might cause three to enter.

From the description of the mechanical details for operating the segments it will appear that a discharge of seed is made from the hopper twice during each revolution of the back roller as the planter is drawn forward, so that the corn will be planted in hills at distances apart equal to half the circumference of the back roller; but it is obvious that by varying or modifying the arrangements a more or less frequent discharge may be made, as required.

To obviate the clogging of the seed in the seed-apertures of the segments, and to prevent a larger quantity than is designed being discharged from the said apertures, self-adjusting double-acting spring-slides e are arranged underneath the dividing-piece or partition c of the hopper, and so that they rest upon or nearly touch the segments over the distributing-tube or discharge-outlets thereto. These slides are made capable of an easy lateral movement in either direction by means of U-shaped springs f, by which arrangement the seed-segments, as they vibrate in either direction, will be cleared of any superabundant seed crowding into their apertures or projecting above them by the striking of the seed against the spring-slides, that by their pliability and capability of lateral movement will cause the projecting seed to be cleared off from out of or over the seed-apertures in an easy but effectual manner without bruising or injuring the seed, as the slides will yield or work to one side more easily at first as the seed strikes them by reason of the slight resistance offered by the springs, so that the seed in striking the spring-slide will not be injured, nor yet be bruised or injured by the after action of the slides, should the first contact of the seed with them fail to effect the clearance as the resistance offered by the slides in their lateral movement is only gradually increased, while the rigid nature of the slides will prevent them yielding, except through the springs, and insure them at some portion of their action effecting the clearance, and, by the arrangement of the springs, the said slides will not only be rendered capable of action in either direction but made self-adjusting as regards returning to their original and proper position after having cleared off the superabundant or projecting seed. Thus these spring clearing-slides are greatly superior to the brush in common use for the same purpose, will be more durable and cheaper, as the slides may be formed of plain cast-iron plates, and will not be attended with that uncertainty of action which the brush, by allowing the superabundant seed to clog in the seed-slides and pass it, is known to possess.

The pivot-joints of the vibrating segments or seed-slides at the extremities of their branches or arms are made by casting the joint-holes in the arms s of single or double key-hole form, as more clearly represented in Fig. 5, and constructing the jointing-pin x with ears projecting from the reduced end of the pin at its top, so that to establish the joint the branch openings in the joint-hole of the arm are brought in line with the projecting ears or lips of the pin, when the joint may be made by causing the lips or ears of the pin to enter through and above the branch openings in the joint-holes, so that by either turning the pin or segment to cause the projecting ears of the pin to lap over the arm at right angles to the branch openings in the joint-holes, when the segments are situated so as to gear in their middle, a cotter-joint, as it were, is made, from which the segments in the course of their regular vibrations cannot get loose without, however, the employment of a loose cotter. This mode of pivoting the vibrating segments has many advantages over the usual method of forming similar joints—such as avoiding the expense of all drilling and riveting or fitting a loose cotter or nut to the pin to secure the joint when made—and it avoids the inconvenience, which frequently arises with loose cotter and nut fastenings, of the joint working or breaking loose, while it offers greater convenience for detaching the segments for cleaning or repair, as there is no fastening to loosen, but only requires the segment to be turned partly round till it arrives in the proper position for lifting off.

To the draft-bar F of the planter, which is jointed or pivoted at its back extremity, pulverizing-gages G on either side of the plow I are connected by link-rods g, and the said gages pivoted at their front ends to the machine, so that as the draft-bar is raised or lowered the gages G rise or fall with it, whereby the gages are regulated to determine the depth of the furrow by the raising or lowering of the draft-bar to suit the draft, accordingly as a deep or shallow furrow is required. The draft-bar and pulverizing-gages are set or fixed at their required elevations by passing a pin or bolt through any one of a series of holes made in a frame, h, and through a hole in the draft-bar which passes in between or out through the said frame h. Thus for a deep furrow the pulverizing gages or shoes G are raised and the draft-bar to its requisite position for the draft simultaneously raised by the one operation of raising the draft-bar, or to make a shallow furrow the gages and draft-bar simultaneously lowered and fixed at their proper elevations, as specified. This arrangement for simultaneously raising or lowering the draft-bar and gages and fixing them at their required elevations is greatly superior to separately operating the draft-bar and gages, as much time and labor are thereby saved.

The soil which is turned up by the plow is pulverized by the gages, which, as before observed, determine the depth of the furrow by the broad bearing-surface which they take upon the ground and prevent the plow sinking below a set depth, as usual with other pulverizing-gages, while the coverers m at the back of the plow throw in the pulverized earth upon the seed after it is planted, and the back roller, D, follows to perfect the covering process.

What I claim as new and useful in corn or seed planters, and desire to secure by Letters Patent, is—

1. Linking or otherwise equivalently attaching the pulverizing-gages to the draft-bar in such a manner that the gages are raised or lowered, to regulate the depth of furrow to be cut, by elevating or depressing the draft-bar to its proper pitch or height for the draft at a given depth of furrow, and whereby the draft-bar and gages are simultaneously raised or lowered, essentially as set forth.

2. The combination and arrangement of the vibrating seed segment-slides B, geared together by cogs or teeth on their peripheries and operating in unison, as herein set forth.

3. The manner of pivoting or jointing the vibrating segments at their centers of motion by constructing the jointing-pin with projecting ears or lips and forming the joint-hole of a keyhole shape, as represented and described.

4. In combination with seed-distributing slides, the employment of the double-acting spring clearing-sides s, arranged so as to be capable of lateral movement in either direction, and made self-adjusting to their original position, substantially as and for the purposes specified.

In testimony whereof I have hereunto subscribed my name.

CHARLES W. BILLINGS.

Witnesses:
   MILTON G. STARRETT,
   WILLIAM CHAPMAN.